Aug. 19, 1969  J. P. IZATT  3,461,675

WATERING AND DRAINAGE SYSTEM

Filed Aug. 18, 1967  2 Sheets-Sheet 1

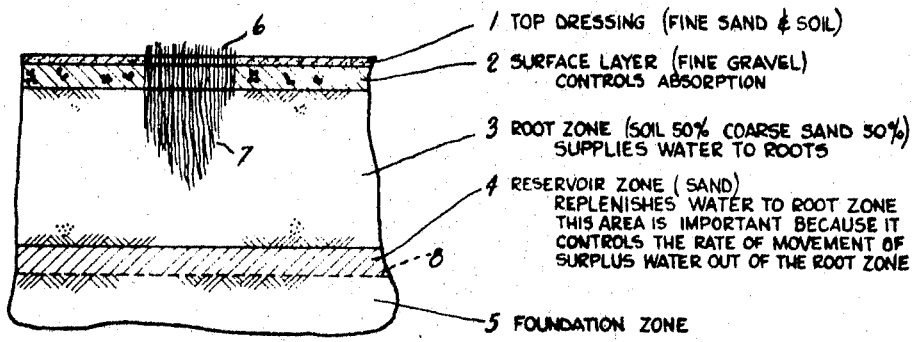

Fig. 1.

1 TOP DRESSING (FINE SAND & SOIL)
2 SURFACE LAYER (FINE GRAVEL) CONTROLS ABSORPTION
3 ROOT ZONE (SOIL 50% COARSE SAND 50%) SUPPLIES WATER TO ROOTS
4 RESERVOIR ZONE (SAND) REPLENISHES WATER TO ROOT ZONE THIS AREA IS IMPORTANT BECAUSE IT CONTROLS THE RATE OF MOVEMENT OF SURPLUS WATER OUT OF THE ROOT ZONE
5 FOUNDATION ZONE

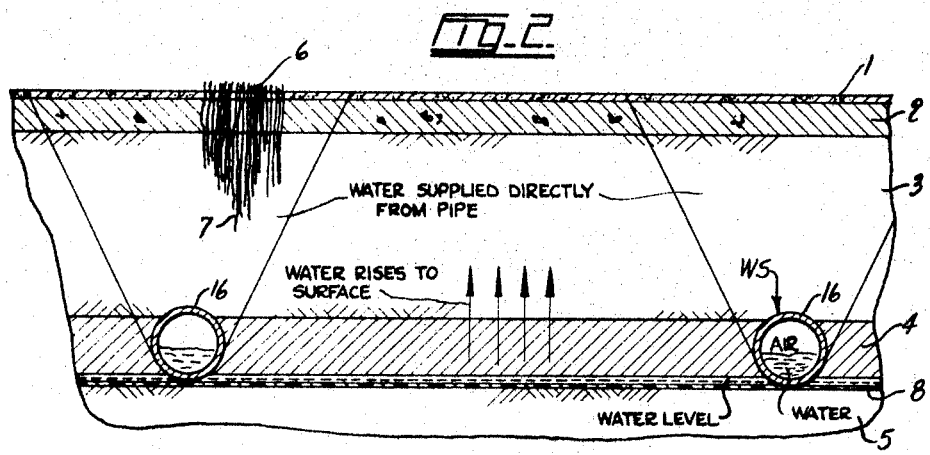

Fig. 2.

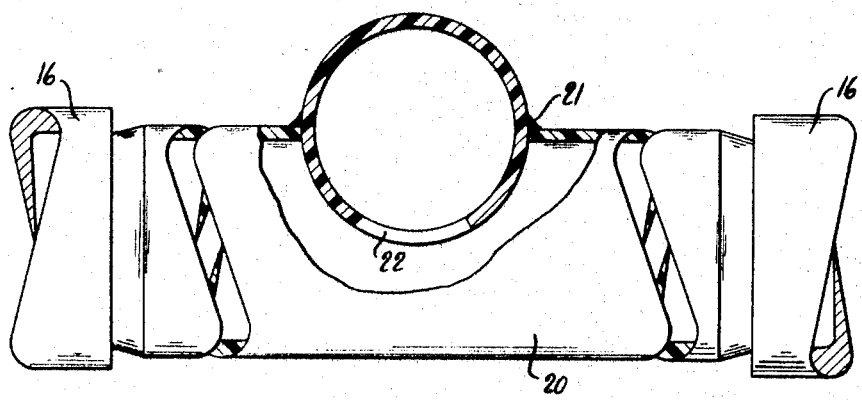

Fig. 4.

INVENTOR
JAMES PATERSON IZATT
BY
ATTORNEYS

United States Patent Office 3,461,675
Patented Aug. 19, 1969

3,461,675
WATERING AND DRAINAGE SYSTEM
James Paterson Izatt, Cobham, England (986 Baycrest Drive, North Vancouver, British Columbia, Canada)
Filed Aug. 18, 1967, Ser. No. 661,663
Claims priority, application Great Britain, Aug. 19, 1966, 37,358/66
Int. Cl. E02b 11/00, 13/00
U.S. Cl. 61—11            3 Claims

ABSTRACT OF THE DISCLOSURE

A system for controlling the moisture content of a planted area by the provision of a subterranean water-impervious zone superposed by a reservoir zone including a water distribution system.

BACKGROUND OF THE INVENTION

This invention relates to a watering and drainage system for application to selected areas of soil for the cultivation of turf and other vegetation. In particular, the invention is directed to the improvement of turf required for golf courses, especially the greens of golf courses, soccer and cricket pitches, bowling greens, lawns, vegetable gardens, hothouses, and generally any such like large area suitable for growing plant life in a substantial way.

It is often difficult to adequately and effectively irrigate a golf green or similar area by surface sprinkling, particularly when the sub-soil has become compacted to the extent that it will resist the penetration of water. The same compacted sub-soil presents other problems during rainy seasons when it becomes necessary to ensure proper drainage if the green is to remain playable.

SUMMARY OF THE INVENTION

The object of the invention is to provide an improved construction of the selected area to be treated so as to improve the growing condition for the particular turf and plant life required to be grown on that area, and at the same time reduce the compaction factor which is generally present throughout soils. In the application of the system according to the invention, the moisture content of the selected area is neutralized as required so as to control the soil condition for giving effective growth of the plant life on the top surface of the soil. The invention seeks to provide a layered soil area which not only has an effective drainage for surface water but also enables water to be applied from the base so that it circulates upwardly, and thereby can control the rooting of the plant life at the surface of the selected area. As a result, in the system according to the invention, the following factors in the growth of turf or other vegetation on the surface of the selected area can be controlled to contribute to healthier plant life; deep root formation, easy maintenance and labor saving, water control and saving, lack of flooding, lack of drought, under ground areation, control of fertilizers, control of evaporation, and area may be kept in use even while being watered from below.

The invention is primarily based on the principle that water moves slowly through the earth from a high to a low level in general, and that the water content within the soil is controlled by the atmospheric air temperature, and that water is heavier than air.

According to the invention there is provided a system of watering and draining a selected area of soil for the cultivation and turf or other vegetation on the top surface thereon, wherein at a predetermined position below the upper surface of the area there is embedded, to cover substantially the whole area, a substantially water-impervious layer of material, and above this layer and adjacent thereto there is embedded in the soil, a water distribution system arranged to distribute water throughout the area and being of a material in some or all of its parts which allows, or is constructed to allow, percolation of water therethrough.

According to the principal feature of the invention, the system of watering and draining a selected area of soil for the cultivation of turf or other vegetation on the top surface thereof consists in building up a layered soil construction in which there is a number superposed parallel zones comprising a foundation zone covered by a reservoir zone, in turn covered by a rooting zone which has superposed thereon a surface zone, followed by a top dressing zone in which the vegetation to be grown is planted. Between the foundation zone and the reservoir zone there is interposed a substantially water-impervious layer which may be a synthetic plastic sheet of suitable gauge covering the whole of the area under control, and adjacent to this impervious layer there is a water distribution system consisting of pipes radiating in all directions from the centre of the area and to a perimeter ring pipe being composed of a material which allows, or is constructed to allow, percolation of water therethrough into the reservoir zone whereby to provide for upward circulation of water to the surface area where the vegetation is growing.

The water circulation piping system may be a plastic product or a pitch fibre or a clay pipe product with suitable porosity, the efficiency of the plastic product providing probably in the order of 75%, while a combination of plastic and clay piping would probably give an efficiency approaching 100%.

In order that the invention may be readily understood, reference will now be made to the accompanying drawings which illustrate, somewhat schematically, a typical application thereof to a selected area of substantial proportions such as, for example, a golf green where it is important to ensure that an overall and uniform water control circulation is provided over the area to enable a reasonable and average growth of grass to be maintained on the upper surface.

BRIEF DISCRIPTION OF THE DRAWINGS

FIGURE 1 shows a cross-section of the selected area,

FIGURE 2 is a similar cross-section showing the water circulation system embodied in the soil of the area, FIGURES 4 and 4a show details of the T-jointing or connection between various pipes of the water circulation system.

DESCRIPTION OF THE PREFERRED EMBODIMENT

Figure 3:
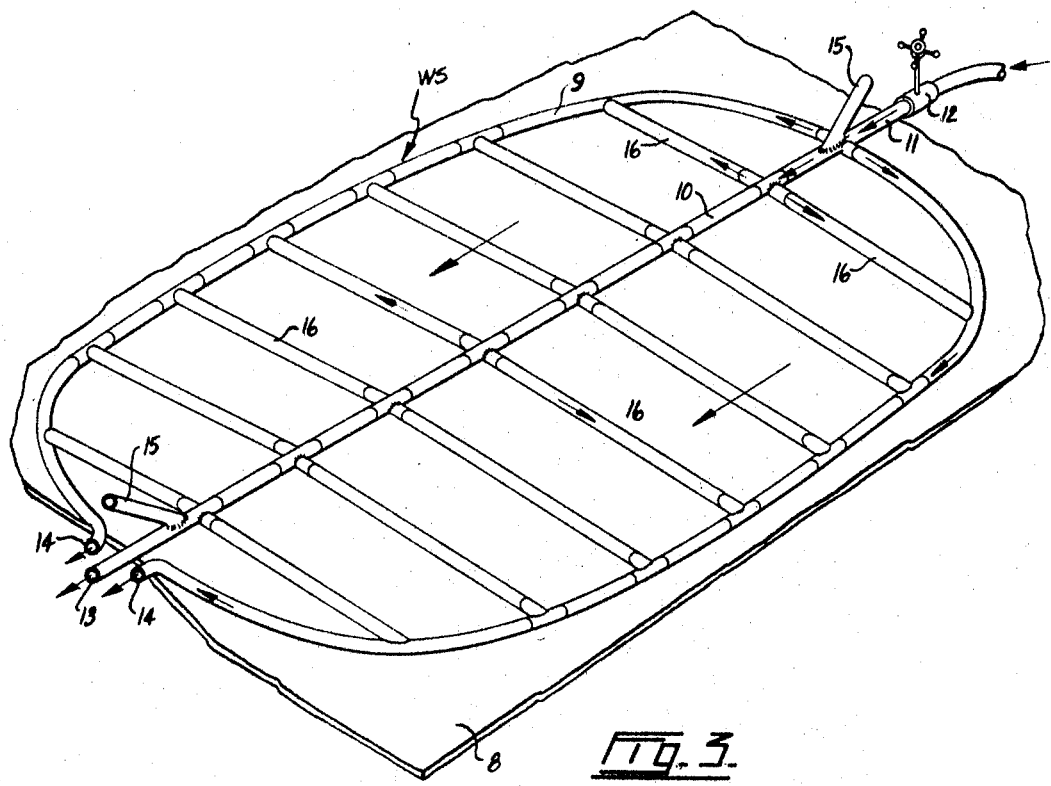
FIGURE 3 is a perspective view of the water distribution system.

With reference to FIGURE 1, it will be seen that the selected area has a through thickness or depth composed of a number of zones, zone 5 being a foundation area of any suitable material superposed on which is a reservoir zone 4 of soil, and on this a root zone 3 is covered by a surface layer zone 2 with a top dressing zone 1 in which the grass 6 grows with its roots 7 passing down through the surface layer zone 2 to the root zone 3. The top dressing zone 1 may be fine sand and soil graded between $\frac{1}{100}$–$\frac{1}{250}$, while the surface zone 2 may be fine grade $\frac{1}{12}$ to $\frac{1}{25}$, the root zone being a soil 50% and a coarse sand 50% which supplies the water to the roots as it rises from the reservoir zone 4 which is supplied by the rain water.

The surface layer zone 2 controls the water absorption of the grass, while the root 3 supplies water to the root 7 and the reservoir zone 4 replenishes the water supply upwards to the root zone 3 and thereby controls the rate of movement of surplus water out of this root zone.

Figure 4A:
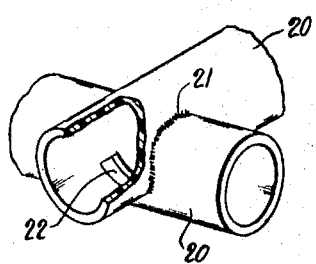

Between the foundation zone 5 and the reservoir zone 4 there is interposed a water-impervious layer 8 (shown dotted in FIGURE 1) which may be of any suitable material, but is conveniently made of a suitable plastic sheeting extending substantially over the whole area of the selected area, as will be seen in FIGURE 3. Above this watertight layer 8 and adjacent thereto in the reservoir zone 4 there is inserted a water drainage system and supply WS (FIGURE 2), the layout of which over the whole area is shown specifically in FIGURE 3 and is arranged to effect distribution over the whole area. Thus this system may consist, as shown, of a perimeter ring pipe 9 with a central supply pipe 10 having a water inlet 11 with suitable stop cock 12 and a water outlet 13 adjacent the outlets 14 of the perimeter pipes 9. At suitable points along the centre pipe 10 there is an air vent 15; for example there may be two such air vents, one at each end of the centre pipe 10. Radiating from the centre pipe 10 are a number of falling pipes 16 which connect the perimeter pipes 9 with the centre pipe 10 of the system. All these pipes are of a porous nature to allow water to enter and also to leave therefrom, and they may be clay drain tiles suitably butt-jointed together and where connection is required between pipes—such as between perimeter pipes 9 and the radiating pipes 16—at each connection there may be a T-joint such as indicated in FIGURES 4 and 4A, and this joint may be made of a plastic piping 20 into which the clay pipes fit at appropriate ends. The T-connection has a plastic weld 21 or is cast in situ, and there is a through aperture 22 to provide the water communication channel.

The arrows in FIGURE 3 indicate the flow of water from the high inlet and to the low outlet end, and it will be observed that water can flow into this drainage system as well as flow out of it and rise through the reservoir zone upwards through the root zone to the roots, as is indicated in FIGURE 2.

It will be observed that the area controlled by the system, according to the invention, in fact results in a ground cell in which the water content can be effectively controlled by the introduction of a calculated amount of water delivered through the water system WS while allowing the surplus water to overflow, leaving a balanced area which thus neutralizes and creates conditions required for suitable growing and maintenance of the growing of the grass or other vegetation on the cell irrespective of the external atmospheric conditions, which may not always be satisfactory for proper growing.

In some circumstances arrangements can be made for recirculation of initial water supplies, for example by forming a sump at the tail of the drain and pumping the exit water from the sump to the main inlet 11, through, if required, an automatic control which may be set to effect pumping at regular intervals or required intervals as may be indicated by the system. Such a re-circulation system would be particularly applicable to a dry area where water is scarce. Further, the underground watering system of the invention can accommodate the use of salt water, especially in sandy regions where there is greater air movement through the installation. For such a use an additional filter zone of sand or other suitable filter material, say to a depth of six feet, would assist to produce a liquid acceptable to the growing of grass. Such a filter zone will also be applicable when sewage water is employed in the water circulating system.

I claim:

1. A system of watering and draining a selected area of soil for the cultivation of vegetation on the top surface thereof, comprising a substantially water-impervious layer disposed at a suitable depth below the top surface, a water distribution network above and adjacent to the water-impervious layer, a reservoir zone of water-retarding material on the water-impervious layer and substantially covering the water distribution network, said water distribution network including a supply pipe through which water is adapted to flow by gravity and a falling pipe at a lower level than said supply pipe, a joint having sleeves interconnecting the supply pipe and the falling pipe, said supply pipe sleeve extending into the upper part of the falling pipe sleeve and having a central aperture disposed centrally of said falling pipe, said central aperture admitting irrigation water fed to the supply pipe into the falling pipe and permitting surplus rain water collected in the reservoir zone and backed up the falling pipe to enter the supply pipe to discharge by gravity flow at the lower end thereof.

2. A system as claimed in claim 1, in which said water-impervious layer comprises a sheet of synthetic plastic.

3. A system as claimed in claim 2, in which said water-distribution network is formed of porous pipe and said joint is formed of a synthetic plastic.

References Cited

UNITED STATES PATENTS

| | | | |
|---|---|---|---|
| 1,200,869 | 10/1916 | Rife | 61—13 |
| 1,171,558 | 2/1916 | Taylor. | |
| 1,171,559 | 2/1916 | Taylor. | |
| 1,591,453 | 7/1926 | Heermans | 61—12 |
| 3,156,490 | 10/1964 | Myll | 61—11 X |
| 3,256,693 | 6/1966 | Mathis | 61—13 |
| 3,307,360 | 3/1967 | Bailly | 61—11 |
| 3,336,755 | 8/1967 | Renfro | 61—11 |

EARL J. WITMER, Primary Examiner

U.S. Cl. X.R.

61—13